(12) United States Patent
Nilsen et al.

(10) Patent No.: US 7,967,272 B2
(45) Date of Patent: Jun. 28, 2011

(54) INDUSTRIAL HANGERS FOR FRAMING AND METHOD OF FABRICATING THE SAME

(75) Inventors: Martin J. Nilsen, Hampshire, IL (US); Michael E. Ward, Geneva, IL (US)

(73) Assignee: Illinois Tool Works Inc., Glenview, IL (US)

( * ) Notice: Subject to any disclaimer, the term of this patent is extended or adjusted under 35 U.S.C. 154(b) by 739 days.

(21) Appl. No.: 11/877,149

(22) Filed: Oct. 23, 2007

(65) Prior Publication Data

US 2008/0224012 A1    Sep. 18, 2008

Related U.S. Application Data

(60) Provisional application No. 60/918,201, filed on Mar. 15, 2007.

(51) Int. Cl.
*B42F 13/00* (2006.01)
(52) U.S. Cl. ........ 248/339; 248/340; 248/214; 248/317; 248/342; 248/343; 411/84; 411/437
(58) Field of Classification Search ................ 248/339, 248/340, 214, 317, 342, 218.4, 219.2, 309.1, 248/200, 343; 138/106; 411/84, 85, 437; 52/39
See application file for complete search history.

(56) References Cited

U.S. PATENT DOCUMENTS

| | | | | |
|---|---|---|---|---|
| 2,215,431 A | * | 9/1940 | Sloan et al. | 294/82.15 |
| 2,250,787 A | * | 7/1941 | Anderson | 411/433 |
| 2,614,785 A | * | 10/1952 | Versen | 248/343 |
| 3,266,202 A | * | 8/1966 | Furer | 52/39 |
| 3,480,246 A | * | 11/1969 | Pfeiffer et al. | 248/327 |
| 3,620,490 A | * | 11/1971 | Roberts et al. | 248/58 |
| 3,981,116 A | * | 9/1976 | Reed | 52/506.1 |
| 4,673,151 A | | 6/1987 | Pelz | |
| 4,805,855 A | * | 2/1989 | Kirby | 248/58 |
| 5,029,364 A | * | 7/1991 | Salazar | 16/382 |
| 5,078,537 A | * | 1/1992 | Nomura | 411/84 |
| 5,085,393 A | | 2/1992 | Ryan | |
| 5,199,675 A | * | 4/1993 | DeGuchi | 248/62 |

(Continued)

FOREIGN PATENT DOCUMENTS

CH    514755    10/1971

(Continued)

OTHER PUBLICATIONS

International Search Report and Written Opinion for PCT/US2008/053908.

*Primary Examiner* — Terrell McKinnon
*Assistant Examiner* — Michael McDuffie
(74) *Attorney, Agent, or Firm* — Mark W. Croll; Paul F. Donovan

(57) ABSTRACT

An industrial hanger is provided for coupling a device to a truss. The hanger apparatus includes a first member having a first support surface, a second opposed support surface, and a threaded portion extending between the first and second support surfaces. The hanger apparatus also includes a second member having a first support surface, a second opposed support surface, and a threaded portion extending between the second member first and second support surfaces. The first member is coupled to the second member such that the first member threaded portion and the second member threaded portions define a substantially circular threaded opening that is sized to receive a threaded rod therein.

12 Claims, 7 Drawing Sheets

U.S. PATENT DOCUMENTS

| | | | |
|---|---|---|---|
| 5,341,619 A | | 8/1994 | Dunagan et al. |
| 5,779,412 A | * | 7/1998 | Nagai et al. ............... 411/85 |
| 5,833,417 A | * | 11/1998 | Sargent et al. ............. 411/85 |
| 6,102,750 A | * | 8/2000 | Little et al. ............... 439/813 |
| 6,601,814 B2 | * | 8/2003 | Kovacik et al. ............ 248/339 |
| 6,921,561 B1 | * | 7/2005 | Maier ......................... 428/11 |
| 7,780,132 B1 | * | 8/2010 | Tomaric ..................... 248/317 |
| 2005/0055945 A1 | | 3/2005 | Hartwick |
| 2005/0056757 A1 | | 3/2005 | Hartwick |
| 2005/0252135 A1 | | 11/2005 | Hartwick |
| 2006/0254190 A1 | * | 11/2006 | Hunt ............................ 52/698 |
| 2007/0017083 A1 | | 1/2007 | Ito |
| 2007/0120025 A1 | * | 5/2007 | Wilson et al. ............ 248/125.7 |

FOREIGN PATENT DOCUMENTS

| | | |
|---|---|---|
| DE | 29518842 | 1/1996 |
| EP | 1024303 | 8/2000 |
| GB | 2239481 | 7/1991 |

* cited by examiner

INDUSTRIAL HANGERS FOR FRAMING AND METHOD OF FABRICATING THE SAME

CROSS REFERENCE TO RELATED APPLICATION

This Non-Provisional Application claims benefit to U.S. Provisional Application Ser. No. 60/918,201 filed Mar. 15, 2007, the complete subject matter of which is expressly incorporated herein in its entirety.

BACKGROUND OF THE INVENTION

The present invention relates generally to an industrial hanger device and more particularly to a device utilized to hang an apparatus from a truss.

Support structures, such as trusses, are utilized to fabricate a wide variety of structures such as buildings and bridges, for example. At least some known trusses include at least an upper chord, in compression, a lower chord, in tension, and a plurality of vertical and/or diagonal members that are coupled between the upper and lower chords. While the trusses are generally utilized to support the building structure, they may also be utilized to support various support systems utilized within the building. For example, trusses utilized within a building may be used to support plumbing systems, electrical systems, light fixtures, sprinkling systems, and various other systems used within a typical building. More specifically, the support systems are generally hung from the trusses utilizing a truss hanger.

At least one known truss hanger is configured to extend between the two portions that form the lower truss. The known truss hanger includes a T-shaped retaining portion and a threaded rod portion that is welded to the retaining portion. During assembly, the retaining portion is inserted through the lower chord such that the retaining portion is positioned above the lower chord and the exposed end of the threaded rod portion extends through the opposite side of the lower chord. The truss hanger is secured to the lower truss using a fastener such as a nut, for example.

While the known truss hanger is cost effective and easy to install, welding the threaded rod portion to the retainer portion is relatively expensive and labor intensive. More specifically, specialized equipment is utilized to perform the welding process. Each weld is then inspected to ensure that the weld is satisfactory prior to the truss hanger being delivered to an installer. Since the threaded rod portion is welded to the retaining portion, each truss hanger is fabricated to include a predetermined length of threaded rod. However, during building construction various systems are required to be installed at varying distances below the lower chord. As such, the manufacturer may fabricate, and the builder may be required to purchase, a variety of truss hangers having various lengths of threaded rod extending from the retainer portion. Alternatively, the manufacturer may fabricate a truss hanger where all the threaded rods have a uniform length. In this case, the installer may be required to purchase additional sections of threaded rod which are then coupled to the threaded rod portion to extend the length of the truss hanger, or may be required to remove a portion of the threaded rod portion to reduce the length of the truss hanger.

A need remains for a truss hanger that reduces the overall cost and time of manufacture by, among other things, eliminating the need to weld the threaded rod portion to the retaining portion, and to also provide a truss hanger that may be used with threaded rods of varying lengths without modifying the truss hanger device.

BRIEF DESCRIPTION OF THE INVENTION

In one embodiment, an industrial hanger apparatus is provided for attaching a device to a truss. The truss has an upper chord and a lower chord that is different from the upper chord. Each of the upper and lower chords has a first bracket and a second bracket, while the truss has a gap between the first and second brackets. The hanger apparatus has a first member having a first support surface, a second opposed support surface, and a threaded portion extending between the first and second support surfaces. The second member has a first support surface, a second opposed support surface, and a threaded portion extending between the second member first and second support surfaces. The first member is coupled to the second member such that the first member threaded portion and the second member threaded portions define a substantially circular threaded opening that is sized to receive a threaded rod therein.

In another embodiment, a hanger apparatus is provided for attaching a device to a truss. The hanger apparatus includes a unitary plate having a first support surface a second opposed support surface. The unitary plate also has a first threaded portion extending from the first support surface at least partially toward the second support surface and a second threaded portion extending from the second support surface at least partially towards the first support surface. The first and second threaded portions are separated by a gap. The first and second threaded portions define a substantially circular threaded opening that is sized to receive a threaded rod therein.

In a further embodiment, a method of fabricating a hanger apparatus is provided. The method includes stamping a first member to include a first edge, a second edge, a first support surface, a second opposed support surface, and a first threaded portion extending between the first and second support surfaces. The method further includes stamping a second member to include a first edge, a second edge, a first support surface, a second opposed support surface, and a second threaded portion extending between the second member first and second support surfaces. The method also includes coupling the first member to the second member such that the first and second threaded portions define a substantially circular threaded opening that is sized to receive a threaded rod therein.

In a still further embodiment, a method of fabricating a hanger apparatus is provided. The method includes stamping a unitary plate to include a first edge, a second edge, a first support surface, and a second opposed support surface, and a first threaded portion extending from the first support surface at least partially toward the second support surface. The method further includes stamping the unitary plate to include a second threaded portion extending from the second support surface at least partially towards the first support surface. The first and second threaded portions are separated by a gap. The first and second threaded portions define a substantially circular threaded opening that is sized to receive a threaded rod therein.

Other features and advantages of the invention will become apparent to those skilled in the art upon review of the following detailed description, claims and drawings in which like numerals are used to designate like features.

Figure 1:
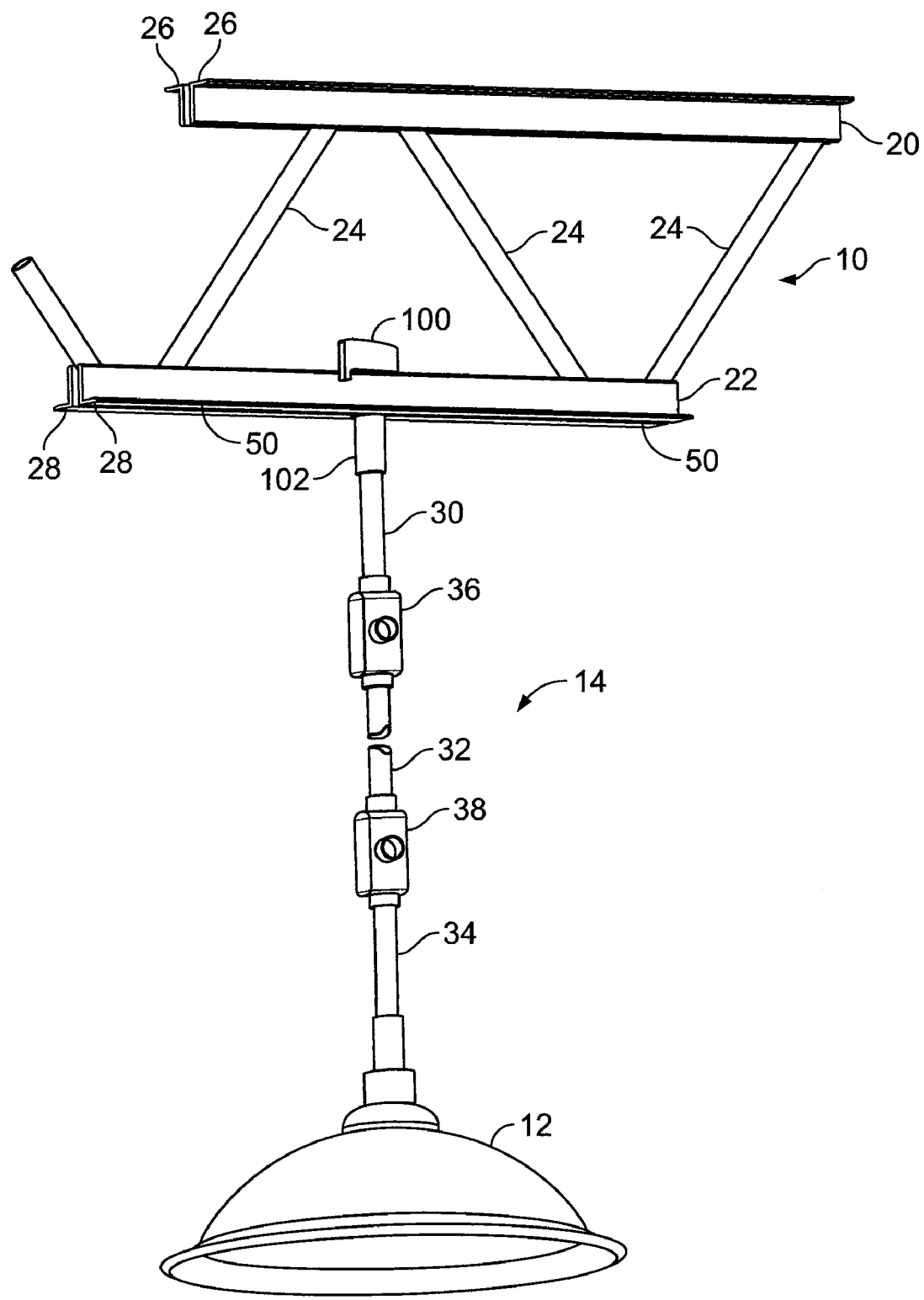
FIG. 1 is a perspective view of a known truss including an upper chord, a lower chord, and an exemplary industrial hanger coupled to the known truss.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

FIG. 1 is a perspective view of an exemplary truss 10 and an exemplary device 12 that may be coupled to truss 10 using an industrial hanger assembly 14. Truss 10 includes an upper chord 20, a lower chord 22, and a plurality of plurality of diagonal members 24 that are coupled between the upper and lower chords 20 and 22. The upper and/or lower chords 20 and 22 may be fabricated using a pair of L-shaped brackets 26 and 28, respectively. The L-shaped brackets may be implemented using angle irons for example. It should be understood that truss 10 is exemplary only and is not limited in its application to the details of construction and the arrangement of the components set forth in the following description or illustrated in the drawings. For example, truss 10 may also include a plurality of vertical struts (not shown) coupled between the upper and lower chords 20 and 22.

The industrial hanger assembly 14 includes a hanger apparatus 100 referred to herein as T-bar apparatus 100 that is installed between, and supported by, either brackets 26 or brackets 28 as will be discussed below. As such, T-bar apparatus 100 may be utilized to mount industrial hanger assembly 14 to either the upper or lower chords 20 and 22, respectively. Industrial hanger assembly 14 also includes a T-bar coupling 102 and a threaded rod 152 (shown in FIGS. 3 and 4) that are each utilized to secure T-bar apparatus 100 to truss 10. Specifically, at least a portion of T-bar coupling 102 has a threaded opening defined therethrough (shown in FIG. 2) that is sized to receive the threaded rod 152 that is coupled to T-bar apparatus 100. Thus, by rotating the T-bar coupling 102 with respect to the T-bar apparatus 100, the distance between the two parts can be easily increased or decreased. Industrial hanger assembly 14 is adapted to interface with conventional items that are typically hung from trusses such as device 12. For example, Industrial hanger assembly 14 may interface with pipes, electrical junction boxes, lighting fixtures, conduit hangers, etc. The industrial hanger assembly 14 also may include conventional pipes 30, 32 and 34 and conventional electrical junction boxes 36 and 38, to provide power and support for device 12.

Figure 2:
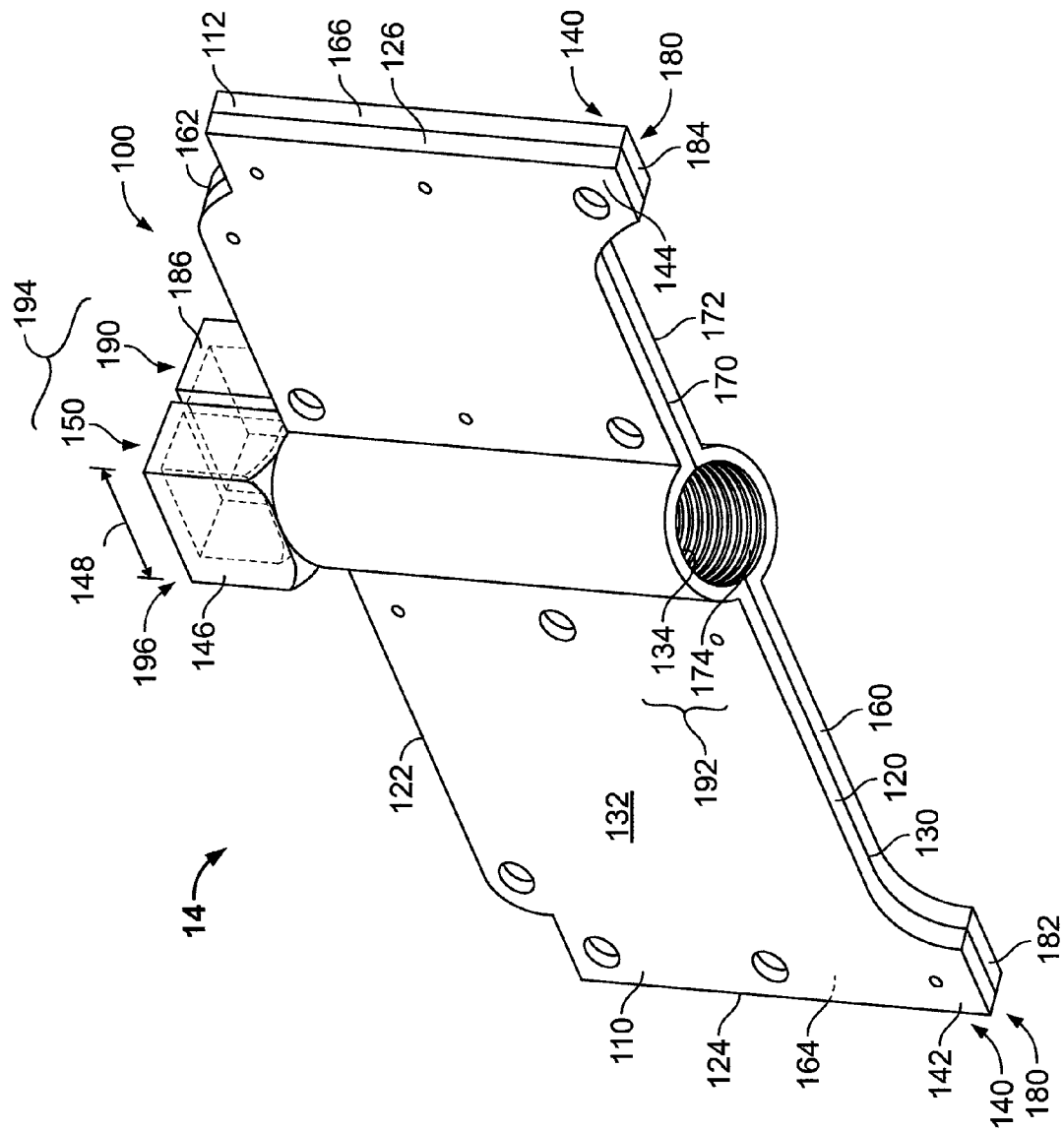
FIG. 2 is a perspective view of a portion of the exemplary industrial hanger assembly shown in FIG. 1 in accordance with an embodiment of the present invention.

FIG. 2 is a perspective view of a T-bar apparatus 100 shown in FIG. 1. T-bar apparatus 100 includes members 110 and 112 that are coupled to one another. Member 110 includes a support surface 120, an opposed support surface 122, an edge 124 and an opposing edge 126. As shown in FIG. 2, support surfaces 120 and 122 are substantially perpendicular to edges 124 and 126 such that member 110 has a substantially rectangular cross-sectional profile. The member 110 also includes an inner surface 130, an opposing outer surface 132, and a threaded portion 134 formed in inner surface 130. The threaded portion 134 extends between the support surfaces 120 and 122. As shown in FIG. 2, the threaded portion 134 is substantially semi-circular in shape and may be formed in member 110 by stamping the threads into member 110. For example, in this embodiment, the member 110 is stamped such that a substantially concave portion including threaded portion 134 is formed in inner surface 130 and a substantially convex portion is formed in outer surface 132.

The member 110 further includes an anti-rotation device 140 that is coupled to, or formed with, support surface 120. The anti-rotation device 140 includes a pair of tabs 142 and 144 that are formed with member 110 or coupled to support surface 120 using a welding or brazing procedure, for example. More specifically, tab 142 is disposed proximate to edge 124 and tab 144 is disposed proximate to edge 126. The member 110 also includes an anti-rotation device 146 that is formed with, or coupled to, opposing support surface 122. In the exemplary embodiment, the anti-rotation device 146 has a substantially rectangular cross-sectional profile that has a width 148 that is slightly smaller that a distance defined between the pair of brackets 26. The anti-rotation device 146 also includes a substantially semi-circular opening 150 formed therethrough which may be formed in member 110 by utilizing a stamping process, for example.

The member 112 includes a support surface 160, an opposed support surface 162, an edge 164 and an opposing edge 166. As shown in FIG. 2, support surfaces 160 and 162 are substantially perpendicular to edges 164 and 166 such that member 112 has a substantially rectangular cross-sectional profile. The member 112 also includes an inner surface 170, an opposing outer surface 172, and a threaded portion 174 formed in inner surface 170. The threaded portion 174 extends between support surfaces 160 and 162. As shown in FIG. 2, the threaded portion 174 is substantially semi-circular in shape and may be formed in member 112 by stamping the threads into member 112. For example, in this embodiment, the member 112 is stamped such that a substantially concave portion including threaded portion 174 is formed in inner surface 170 and a substantially convex portion is formed in outer surface 172.

The member 112 further includes an anti-rotation device 180 that is coupled to or formed with support surface 160. The anti-rotation device 180 includes a pair of tabs 182 and 184 that are formed with or coupled to support surface 160 using a welding or brazing procedure, for example. More specifically, tab 182 is disposed proximate to edge 164 and tab 184 is disposed proximate to edge 166.

The member 112 also includes an anti-rotation device 186 that is formed with, or coupled to, opposing support surface 162. In the exemplary embodiment, the anti-rotation device 186 has a substantially rectangular cross-sectional profile that has a width that is substantially equal to width 148 of anti-rotation device 146. The anti-rotation device 186 also includes a substantially semi-circular opening 190 which may be formed in member 112 by utilizing a stamping process, for example.

In the exemplary embodiment, to fabricate T-bar apparatus 100, member 110 is stamped from a metal plate to form member 110 including threaded portion 134, anti-rotation device 140, and anti-rotation device 146. Moreover, member 112 is stamped from a metal plate to form member 112 including the threaded portion 174, anti-rotation device 180, and anti-rotation device 186. As shown in FIG. 2, member 110 is substantially similar to member 112. In the exemplary embodiment, member 110 is identical to member 112 such that during fabrication, a single stamp may be utilized to manufacture multiple members, any two of which may be coupled together to form T-bar apparatus 100.

The two members 110 and 112 are generally coupled together using a welding procedure to form T-bar apparatus 100. Optionally, member 110 may be coupled to member 112 using a plurality of mechanical fasteners such as bolts or rivets, for example. During assembly, member 110 is coupled to member 112 such that the anti-rotation devices 142 and 144 formed in member 110 are each substantially aligned with the respective anti-rotation devices 182 and 184 formed in member 112, and such that the anti-rotation device 146 formed in member 110 is substantially aligned with the respective anti-rotation device 186 formed in member 112 to form a single anti-rotation device 196. Moreover, as shown in FIG. 2, when member 110 is coupled to member 112, partial openings 134 and 174 form a substantially circular opening 192 that is sized to receive a threaded rod therein (shown in FIGS. 3 and 4), and partial openings 150 and 190, within anti-rotation device 196, form a substantially circular opening 194 that is also sized to receive the threaded rod.

Figure 3:
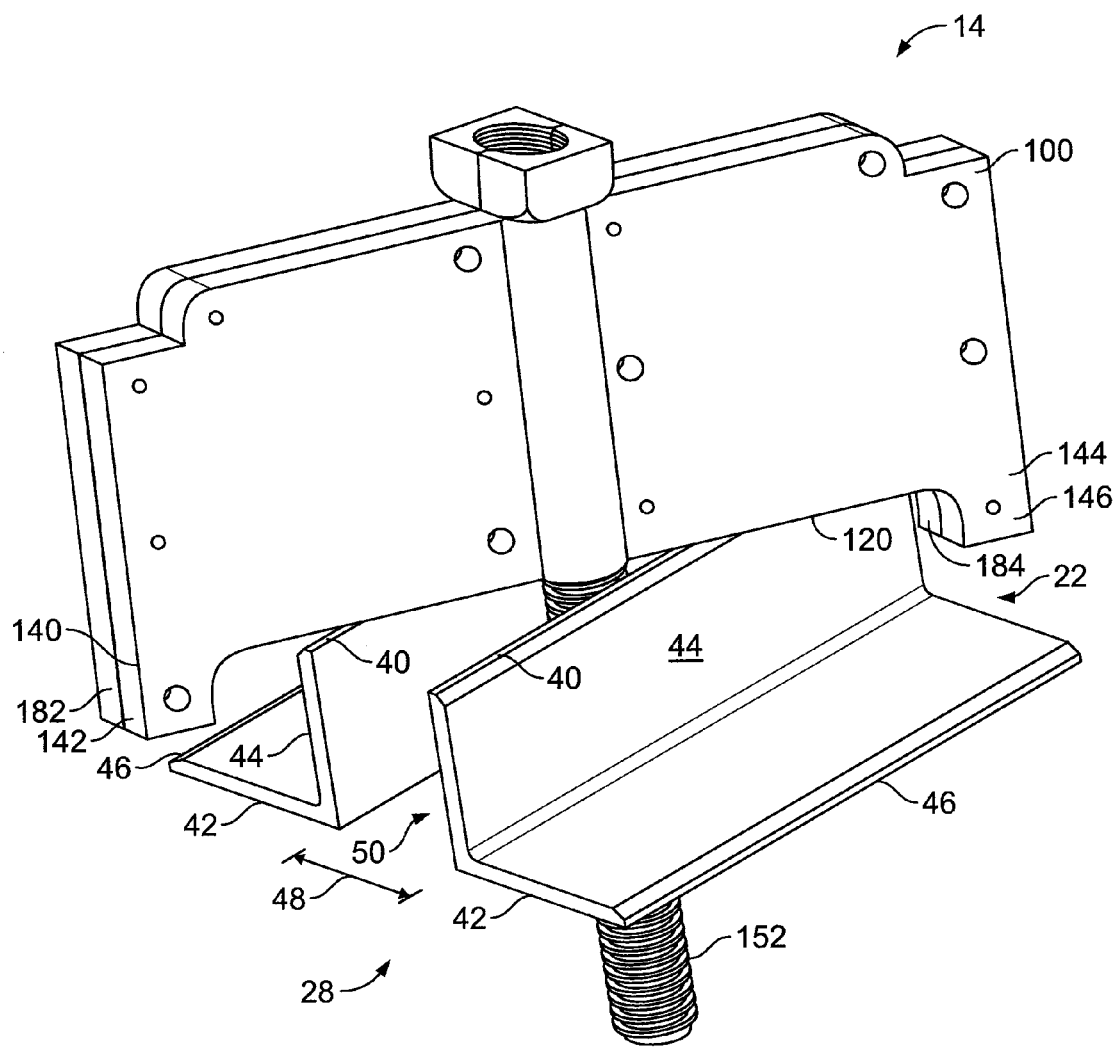
FIG. 3 is a perspective view of the portion of the industrial hanger assembly shown in FIG. 2 installed on to the lower truss chord shown in FIG. 1.
Figure 4:
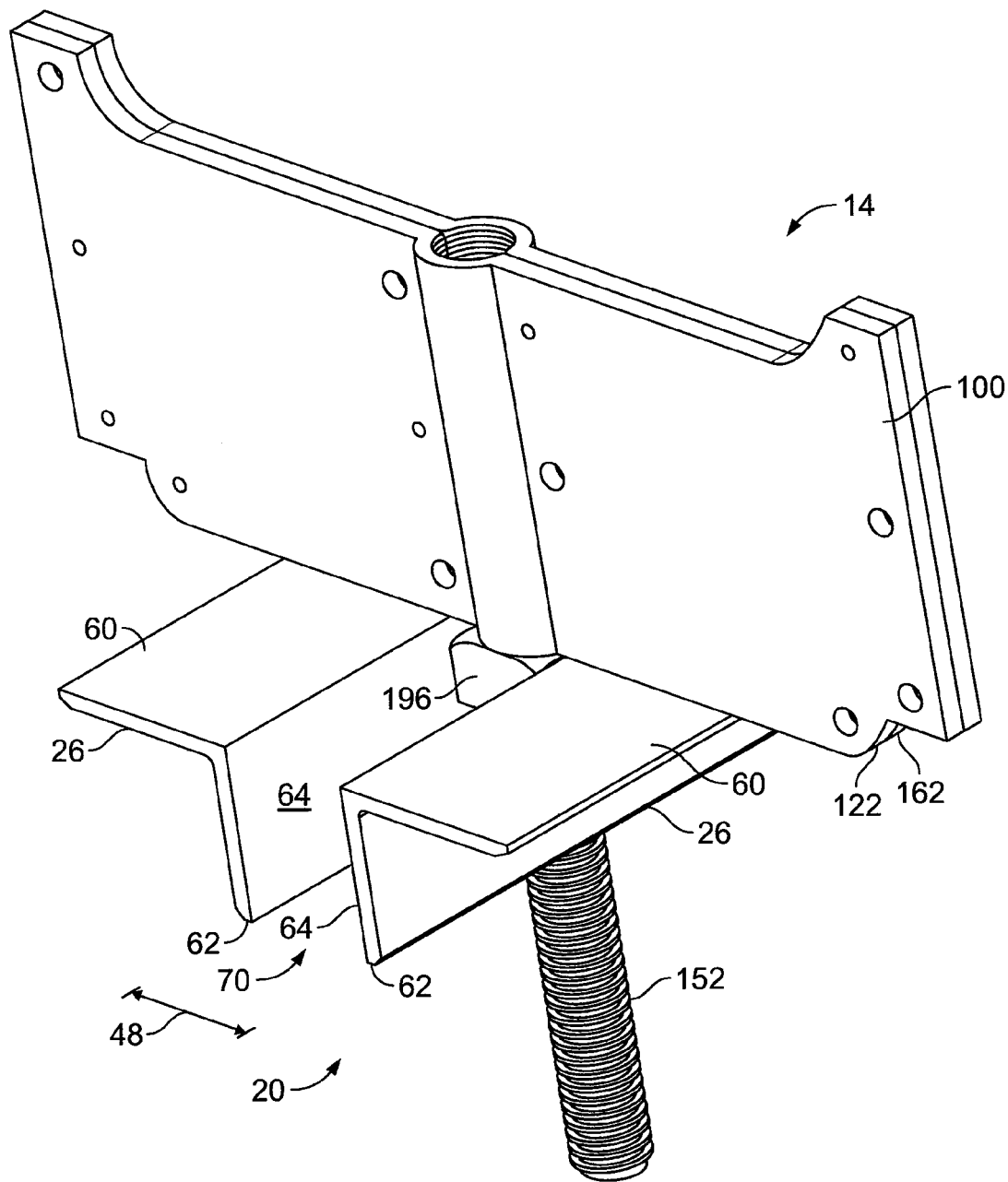
FIG. 4 is a perspective view of the portion of the industrial hanger assembly shown in FIG. 2 installed on the upper truss chord shown in FIG. 1.

FIG. 3 is a perspective view of T-bar apparatus 100 mounted to lower chord 22. FIG. 4 is a perspective view of T-bar apparatus 100 mounted to upper chord 20. Referring to FIG. 3, lower chord 22 includes the pair of brackets 28 each of which generally includes an upper surface 40, a lower surface 42, an inner surface 44, and an outer surface 46, wherein the lower surfaces 42 are approximately perpendicular to the inner surfaces 44. The webbing or diagonal members 24 (shown in FIG. 1) are attached to or between the inner surfaces 44 of the two brackets 28. As a result, the pair of brackets 28 are separated by a distance 48 that is approximately equal to the width of diagonal members 24, and a number of gaps 50 (shown in FIG. 1) are formed between the inner surfaces 44 of the two brackets 28.

One exemplary method of coupling hanger assembly 14 to lower chord 22 includes attaching device 12 to hanger assembly 14 using various pipes 30, 32, and/or 34 or junction boxes 36 and/or 38 shown in FIG. 1. Then, as shown in FIG. 1, pipe 30 is coupled to hanger assembly 14. More specifically, an end of threaded rod 152 is threaded into T-bar apparatus 100, T-bar coupling nut 102 is then coupled to an opposite end of T-bar coupling 102. Pipe 30 is then connected to T-bar coupling 102 by threading pipe 30 into the opposite end of T-bar coupling 102.

Industrial hanger assembly 14 is then positioned so that at least a portion of the T-bar apparatus 100 slides through gap 50 between the pair of brackets 28. T-bar apparatus 100 is then rotated approximately 45 degrees, which can be accomplished by rotating the device 12, for example, until the anti-rotation devices 140 and 146, i.e. tabs 142, 144, 182, and 184, engage the inner surfaces 44 of the brackets 28 in the lower chord 22 of truss 10. As device 12 is continually rotated, the T-bar coupling 102 will increase in height until the upper surface of the T-bar coupling 102 engages the lower surface 42 of at least one of the brackets that form the lower chord 22 of truss 10 and such that the support surfaces 120 and 160 rest on the upper surface 40 of the pair of brackets 28. At this time, the industrial hanger assembly 14 is securely attached to the lower chord 22 truss 10. As is evident in the above description, an installer can safely install the industrial hanger assembly 14 without having to be elevated to the height of the truss.

Referring to FIG. 4, upper chord 20 includes the pair of brackets 26 each of which generally includes an upper surface 60, a lower surface 62, an inner surface 64, and an outer surface 66, wherein the upper surfaces 60 are approximately perpendicular to the inner surfaces 64. The webbing or diagonal members 24 (shown in FIG. 1) are attached to or between the inner surfaces 64 of the two brackets 26. As a result, the pair of brackets 26 are separated by a distance 48 that is approximately equal to the width of diagonal members 24, and a number of gaps 70 (shown in FIG. 1) are formed between the inner surfaces 64 of the two brackets 26.

Coupling hanger assembly 14 to upper chord 20 is substantially similar to the method of coupling to lower chord 22. However, in this embodiment, Industrial hanger assembly 14 is positioned so that at least a portion of the T-bar apparatus 100 slides between gap 70 between the pair of brackets 26. More specifically, T-bar apparatus 100 is raised until anti-rotation device 196 is above the upper surfaces 60 of brackets 26. T-bar apparatus 100 is then rotated approximately 90 degrees, which can be accomplished by rotating the device 12, and lowered into gap 70. When T-bar apparatus 100 is disposed within gap 70, the anti-rotation device 196, i.e. 146 and 186, engage the inner surfaces 64 of the brackets 26 and the support surfaces 122 and 162 rest on the upper surfaces 60 of the brackets 26. Since the anti-rotation device 196 has a substantially square cross-section profile and has a width that is slightly smaller than gap 70, positioning anti-rotation device 196 within gap 70 facilitates preventing hanger assembly 14 from rotating. At this time, the industrial hanger assembly 14 is securely attached to the upper chord 20 truss 10. As is evident in the above description, an installer can safely install the industrial hanger assembly 14 without having to be elevated to the height of the truss.

Figure 5:
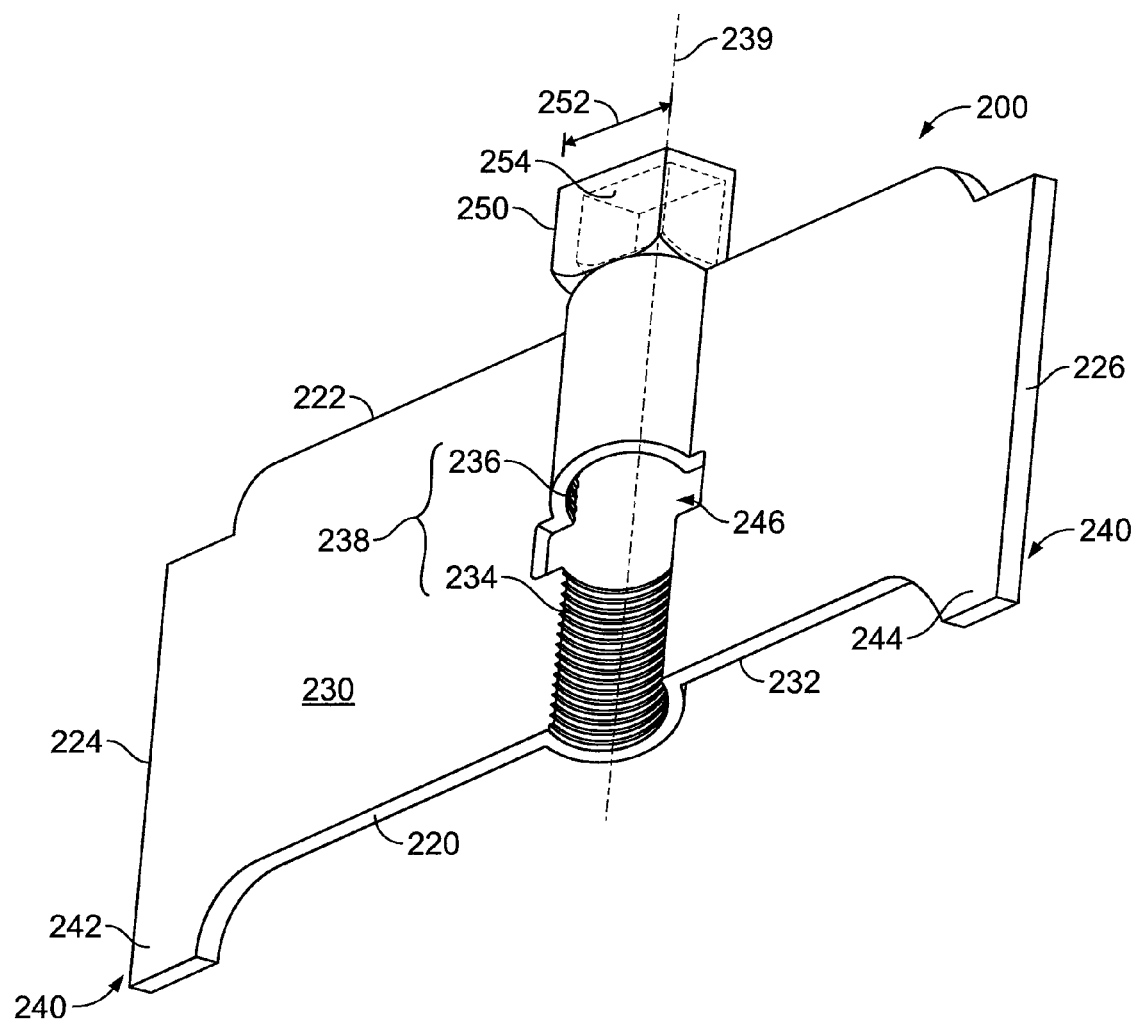
FIG. 5 is a perspective view of a portion of another exemplary industrial hanger assembly shown in FIG. 1.

FIG. 5 is a perspective view of another T-bar apparatus 200 that may be used with the industrial hanger assembly 14 shown in FIG. 1. In the exemplary embodiment, T-bar apparatus 200 is a unitary device that includes a body 210. The body 210 has a support surface 220, an opposed support surface 222, an edge 224 and an opposing edge 226. As shown in FIG. 5, support surfaces 220 and 222 are substantially perpendicular to edges 224 and 226. T-bar apparatus 200 also includes a side 230, an opposing side 232, a threaded portion 234, and a threaded portion 236. The threaded portion 234 extends from support surface 220 at least partially towards support surface 222 and the threaded portion 236 extends from support surface 222 at least partially towards the support surface 220.

As shown in FIG. 5, each of threaded portions 234 and 236 is substantially semi-circular in shape and may be formed in T-bar apparatus 200 using a stamping process, etc. For example, assuming that T-bar apparatus 200 has a centerline 239 extending approximately vertically from support surface 220 to support surface 222, the threaded portion 234 extends from surface 230 and the threaded portion extends from surface 232 such that the combination of threaded portions 234 and 236 define a substantially circular threaded opening 238 having a centerline axis 239. Moreover, as shown in FIG. 5, and in the exemplary embodiment, opening 238 does not extend continuously from support surface 220 to support surface 222, rather a gap 246 is defined between the threaded portions 234 and 236.

T-bar apparatus 200 further includes an anti-rotation device 240 that includes a pair of tabs 242 and 244 that extend from support surface 220 and in the exemplary embodiment are formed unitarily with T-bar apparatus 200. Tab 242 is disposed proximate to edge 224 and tab 244 is disposed proximate to edge 226. In the exemplary embodiment, T-bar apparatus 200 also includes an anti-rotation device 250 that is formed with, or coupled to, opposing support surface 222. In the exemplary embodiment, the anti-rotation device 250 has a substantially rectangular cross-sectional profile that has a width 252 that is slightly smaller that a distance defined between the pair of brackets 28. The anti-rotation device 146 also includes a substantially semi-circular opening 254 formed therethrough which may be formed utilizing a stamping process, for example.

In the exemplary embodiment, to fabricate T-bar apparatus 200, T-bar apparatus 200 is stamped from a metal plate to form body 210 including threaded openings 234 and 236, anti-rotation device 240, i.e. tabs 242 and 244, and optionally anti-rotation device 250.

Figure 6:
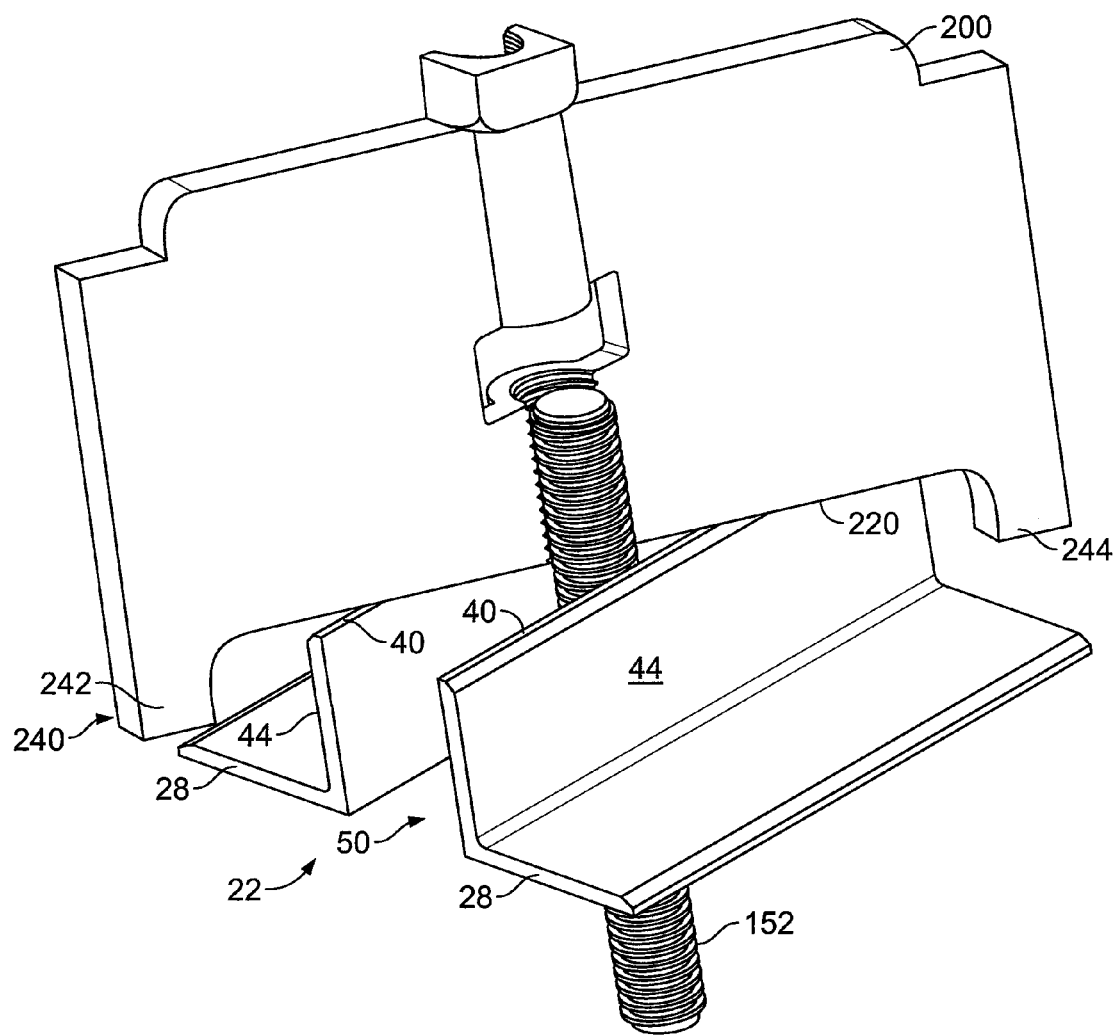
FIG. 6 is a perspective view of the portion of the industrial hanger assembly shown in FIG. 5 installed on to the lower truss chord shown in FIG. 1.
Figure 7:
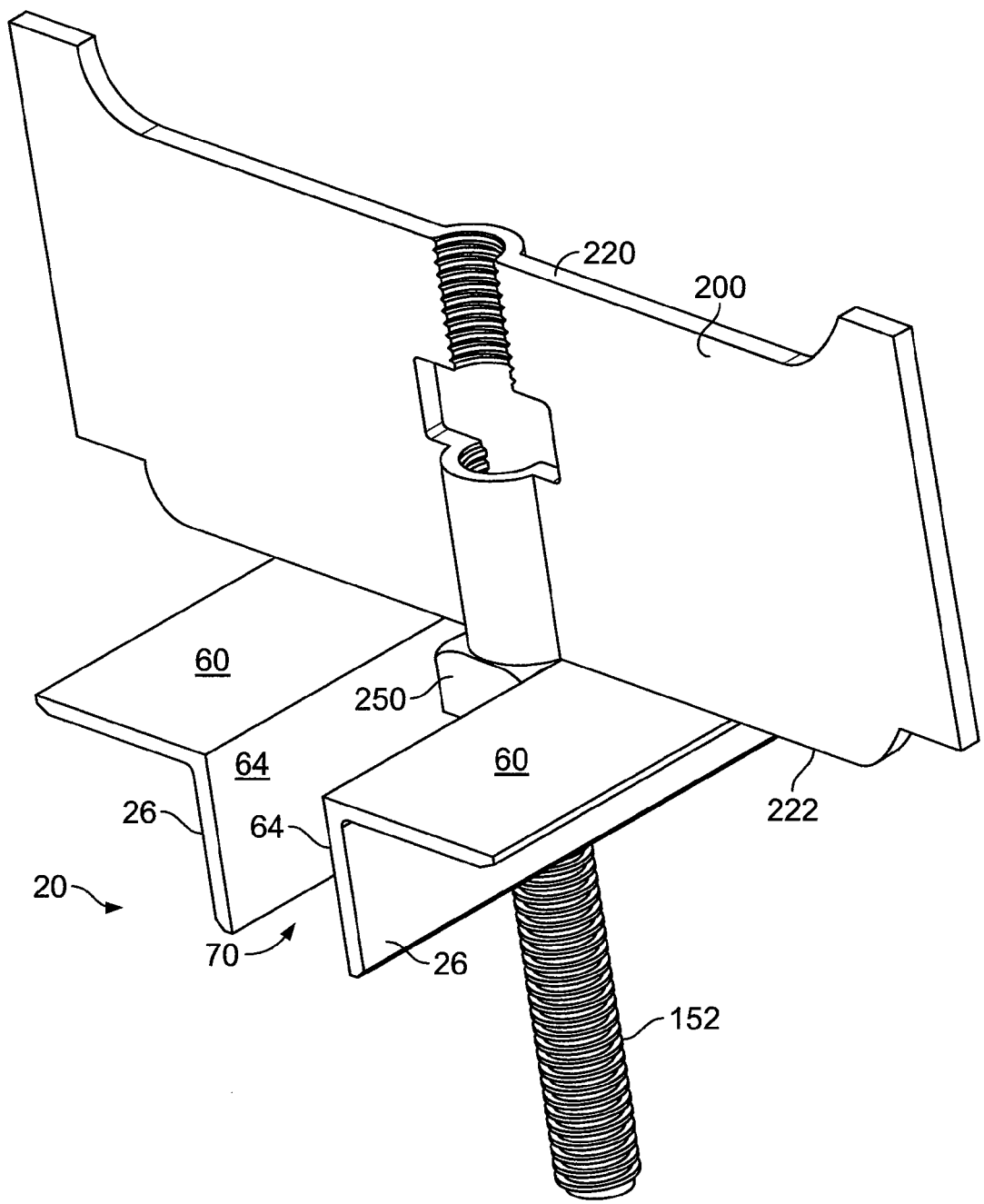
FIG. 7 is a perspective view of the portion of the industrial hanger assembly shown in FIG. 2 installed on the upper truss chord shown in FIG. 1.

FIG. 6 is a perspective view of T-bar apparatus 200 mounted to lower chord 22. FIG. 7 is a perspective view of T-bar apparatus 200 mounted to upper chord 20. One exemplary method of coupling hanger assembly 14, including T-bar apparatus 200, to lower chord 22 includes attaching device 12 to hanger assembly 14 using various pipes 30, 32, and/or 34 or junction boxes 36 and/or 38 shown in FIG. 1. Then, as shown in FIG. 1, pipe 30 is coupled to hanger assembly 14. More specifically, one end of threaded rod 152 is threaded into T-bar apparatus 200, T-bar coupling nut 102 is then coupled to the opposite or exposed end of T-bar coupling 102. Pipe 30 is then connected to T-bar coupling 102 by threading pipe 30 into the exposed end of T-bar coupling 102.

Industrial hanger assembly 14 is then positioned so that at least a portion of the T-bar assembly 200 slides between gap 50 between the pair of brackets 28. The T-bar assembly 200 is then rotated approximately 45 degrees, which can be accomplished by rotating the device 12, for example, until the anti-rotation device 240, i.e. tabs 242 and 244, engage the inner surfaces 44 of the brackets 28 in the lower chord 22 of truss 10. As device 12 is continually rotated, the T-bar coupling 102 will increase in height until the upper surface of the T-bar coupling 102 engages the lower surface 42 of at least one of the brackets that form the lower chord 22 of truss 10 and such that the support surface 220 of T-bar apparatus 200 rests on the upper surface 40 of the pair of brackets 28. At this time, the industrial hanger assembly 14 is securely attached to the lower chord 22 truss 10. As is evident in the above description, an installer can safely install the industrial hanger assembly 14 without having to be elevated to the height of the truss.

Referring to FIG. 7, coupling hanger assembly 14, including T-bar apparatus 200, to upper chord 20 is substantially similar to the method of coupling to lower chord 22. However, in this embodiment, industrial hanger assembly 14 is positioned so that at least a portion of the T-bar assembly 200 slides between gap 70 between the pair of brackets 26. More specifically, T-bar apparatus 200 is raised until the anti-rotation device 250 is above the upper surfaces 60 of brackets 26.

The T-bar assembly 200 is then rotated approximately 90 degrees, which can be accomplished by rotating the device 12, and lowered into gap 70. When T-bar apparatus 200 is disposed within gap 70, the anti-rotation device 250, engages the inner surfaces 64 of the brackets 26 and the support surface 222 rests on the upper surfaces 60 of the brackets 26. Since the anti-rotation device 250 has a substantially rectangular cross-sectional profile and has a width that is slightly smaller than gap 70, positioning anti-rotation device 250 within gap 70 facilitates preventing hanger assembly 14 from rotating. At this time, the industrial hanger assembly 14 is securely attached to the upper chord 20 truss 10. As is evident in the above description, an installer can safely install the industrial hanger assembly 14 without having to be elevated to the height of the truss.

Described herein is an industrial hanger assembly that includes a T-bar assembly that is configured to receive a threaded rod from either end of the T-bar assembly. Each of the T-bar assemblies described herein may be utilized to couple a device to either the upper or lower chords of a truss without modifying the T-bar assembly. Specifically, the first T-bar assembly includes a pair of stamped plates that are coupled together such as by spot welding, to create a one-piece part. During fabrication, a single stamping can create both plates. In the bottom chord application includes a first anti-rotation feature is provided, and in the top chord a second anti-rotation feature is provided that is different than the first anti-rotation feature. For the top chord, the anti-rotation feature is adapted to pass through a truss and, upon rotation of the plate, fall back into the passageway while the flat surface of the plate sits on the top chord. Because the anti-rotation feature, i.e. a square nut in this embodiment, sits in the passageway, the part cannot undesirably rotate. The stamping is such that a portion of the material can be displaced from the top flat surface to create the projections or anti-rotation features for the bottom chord application, thereby saving material costs and the like. The edges of the top chord are shouldered off to facilitate installation and do not adversely affect the positioning of the top surface of the plate onto the flat surface of the top chord.

The second T-bar apparatus is similar to the first T-bar apparatus except a one-piece plate or stamping is utilized. The threaded receiving area within the second T-bar adapter is adapted to receive a threaded bolt from either end of the threaded opening as is readily apparent. In the bottom chord application a first anti-rotation feature is provided, and in the top chord a second anti-rotation feature is optionally, provided that is different than the first anti-rotation feature. The T-bar apparatuses described herein may be fabricated using a variety of materials such as steel, aluminum, nylon, or plastic.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A hanger apparatus for attaching a device to a truss, the truss having an upper chord and a lower chord, the upper and lower chords each having a first bracket and a second bracket separated by a gap, the hanger apparatus comprising:

a support member comprising opposed first and second support surfaces, wherein the first support surface is configured to support the hanger apparatus from the upper chord, and the second opposed support surface is configured to support the hangar apparatus from the lower chord;

a first threaded portion extending from the first support surface at least partially toward the second support surface;

a second threaded portion extending from the second support surface at least partially towards the first support surface;

a first anti-rotation device formed unitarily with the first support surface; and a second anti-rotation device formed unitarily with the second support surface, the second anti-rotation device is different than the first anti-rotation device;

wherein the support member is a unitary plate, and wherein the first and second threaded portions are separated by a gap, the first and second threaded portions defining a substantially circular threaded opening.

2. A hanger apparatus in accordance with claim 1, wherein the unitary plate has a width that is less than a width of the gap between the brackets to enable the hanger assembly to be inserted through the gap.

3. A hanger apparatus in accordance with claim 1, wherein the first anti-rotation device comprises a pair of tabs that restrict the rotation of the hangar apparatus with respect to lower chord by contacting an outer surface of the lower chord brackets.

4. A hanger apparatus in accordance with claim 1, wherein the second anti-rotation device comprises a square nut that restricts the rotation of the hangar apparatus with respect to upper chord by contacting an inner surface of the upper chord brackets.

5. A hanger apparatus for attaching a device to a truss, the truss having an upper chord and a lower chord, the upper and lower chords each having a first bracket and a second bracket separated by a gap, the hanger apparatus comprising:

a support member comprising opposed first and second support surfaces;

a first threaded portion extending from the first support surface at least partially toward the second support surface;

a second threaded portion extending from the second support surface at least partially towards the first support surface;

a first anti-rotation device formed unitarily with the first support surface; and a second anti-rotation device formed unitarily with the second support surface, the second anti-rotation device is different than the first anti-rotation device, wherein the second anti-rotation device comprises a square nut that restricts the rotation of the hangar apparatus with respect to the upper chord by contacting an inner surface of the upper chord brackets.

6. A hanger apparatus in accordance with claim 5, wherein the support member comprises:

a first member including first member first and second support surfaces, and a first member threaded portion extending between the first member first and second support surfaces; and a second member including second member first and second support surfaces, and a second member threaded portion extending between the second member first and second support surfaces, the first member being coupled to the second member such that the threaded portions on the first and second members define a substantially circular threaded opening, the opening being sized to receive a threaded rod therein.

7. A hanger apparatus in accordance with claim 6, wherein the first and second member first support surfaces are configured to support the hanger apparatus from the upper chord, and the first and the second member second support surfaces are configured to support the hanger apparatus from the lower chord.

8. A hanger apparatus in accordance with claim 6, wherein the hanger assembly has a width that is less than a width of the gap to enable the hanger assembly to be inserted through the gap.

9. A hanger apparatus in accordance with claim 6, wherein the first member is substantially similar to the second member.

10. A hanger apparatus in accordance with claim 7, wherein the first anti-rotation device is formed unitarily with the first member first support surface, and the second anti-rotation device is formed unitarily with the first member second support surface.

11. A hanger apparatus in accordance with claim 10 wherein the first anti-rotation device comprises a pair of tabs.

12. A hanger apparatus in accordance with claim 11 wherein the pair of tabs restrict rotation of the hangar apparatus with respect to the lower chord by contacting an outer surface of the lower chord brackets.

* * * * *